Oct. 14, 1958
E. A. TAYLOR
2,855,702
INSTRUCTION AND AMUSEMENT DEVICE FOR
TEACHING THE ART OF SAILING A BOAT
Filed Dec. 26, 1956
4 Sheets-Sheet 4
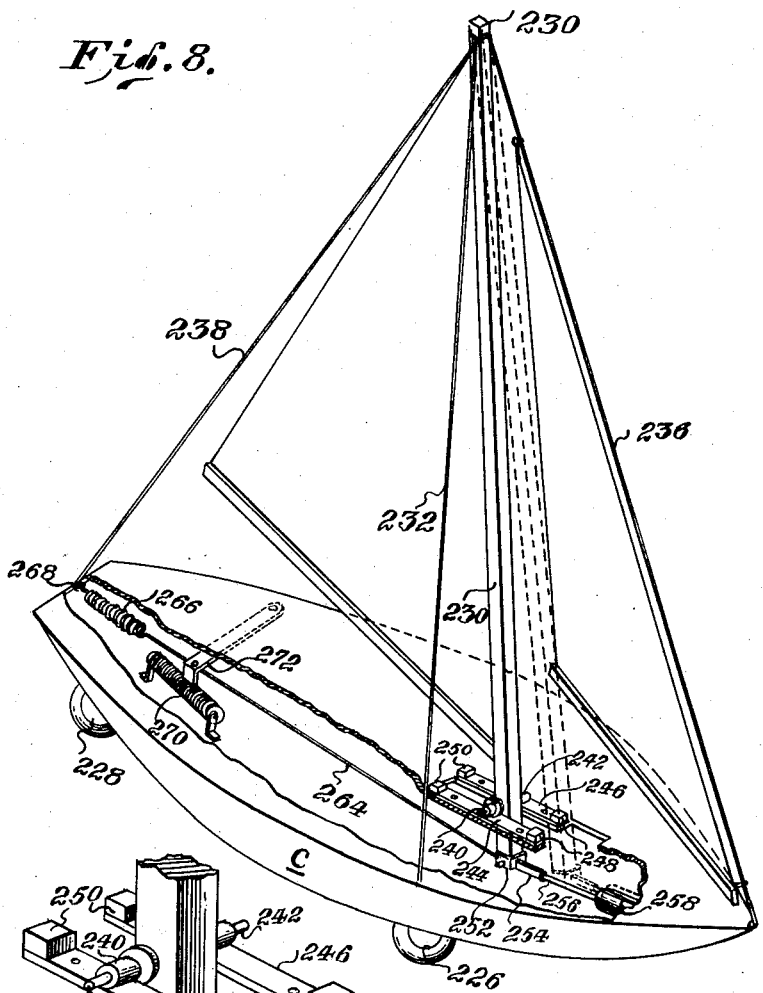
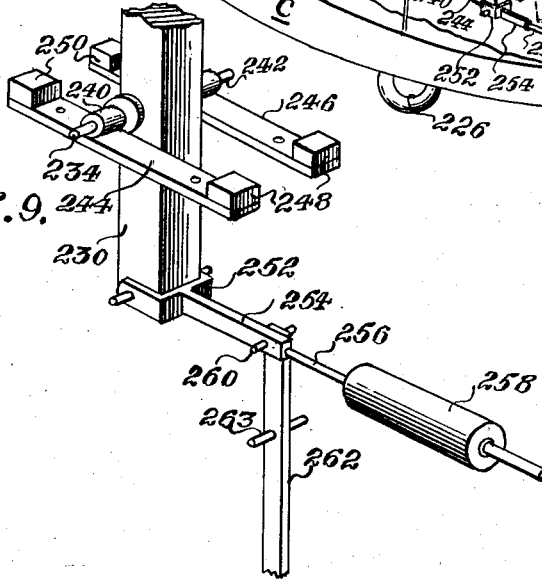
INVENTOR.
EDWARD A. TAYLOR.
BY
*Mason & Mason*
*Attorneys.*

# United States Patent Office 2,855,702
Patented Oct. 14, 1958

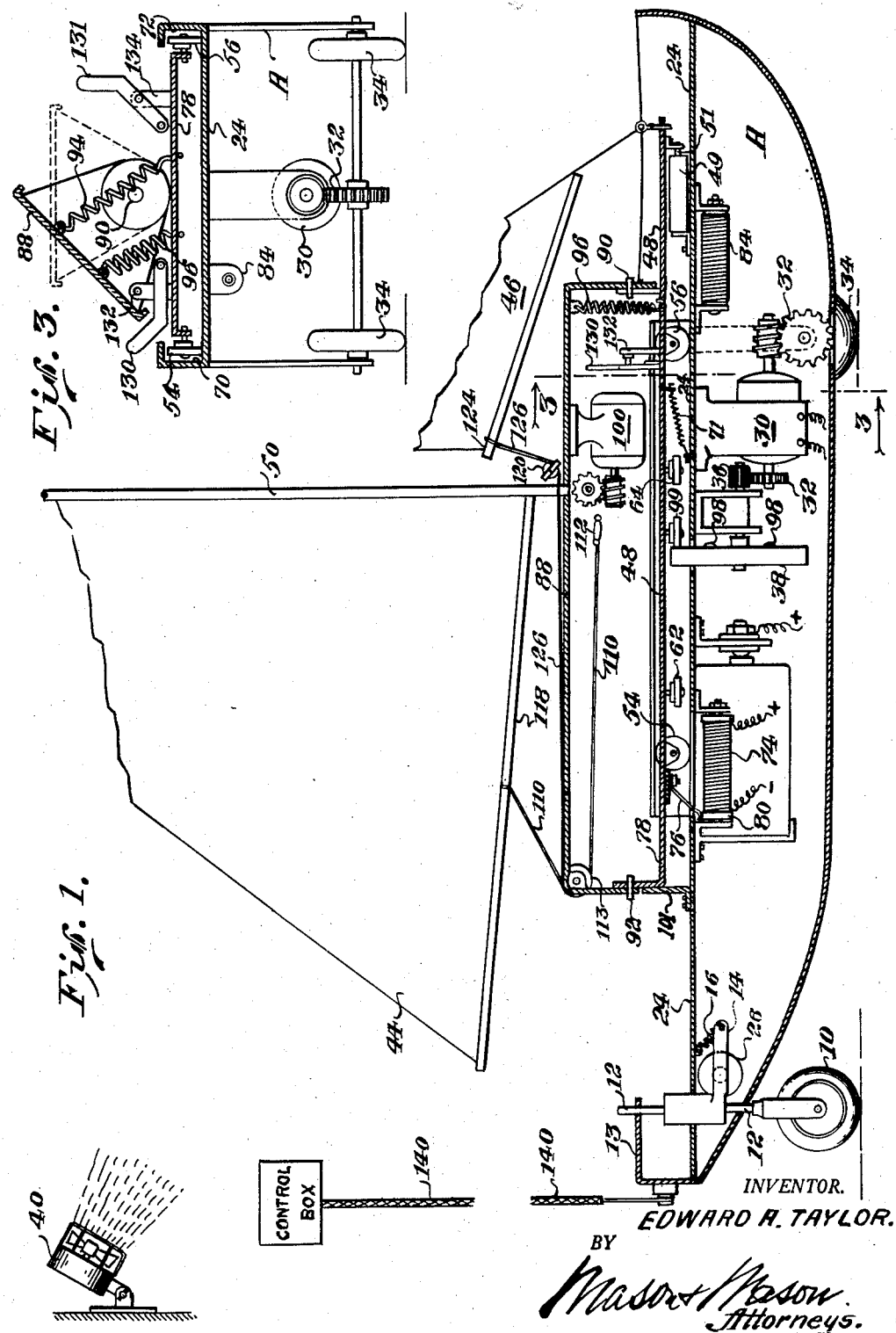

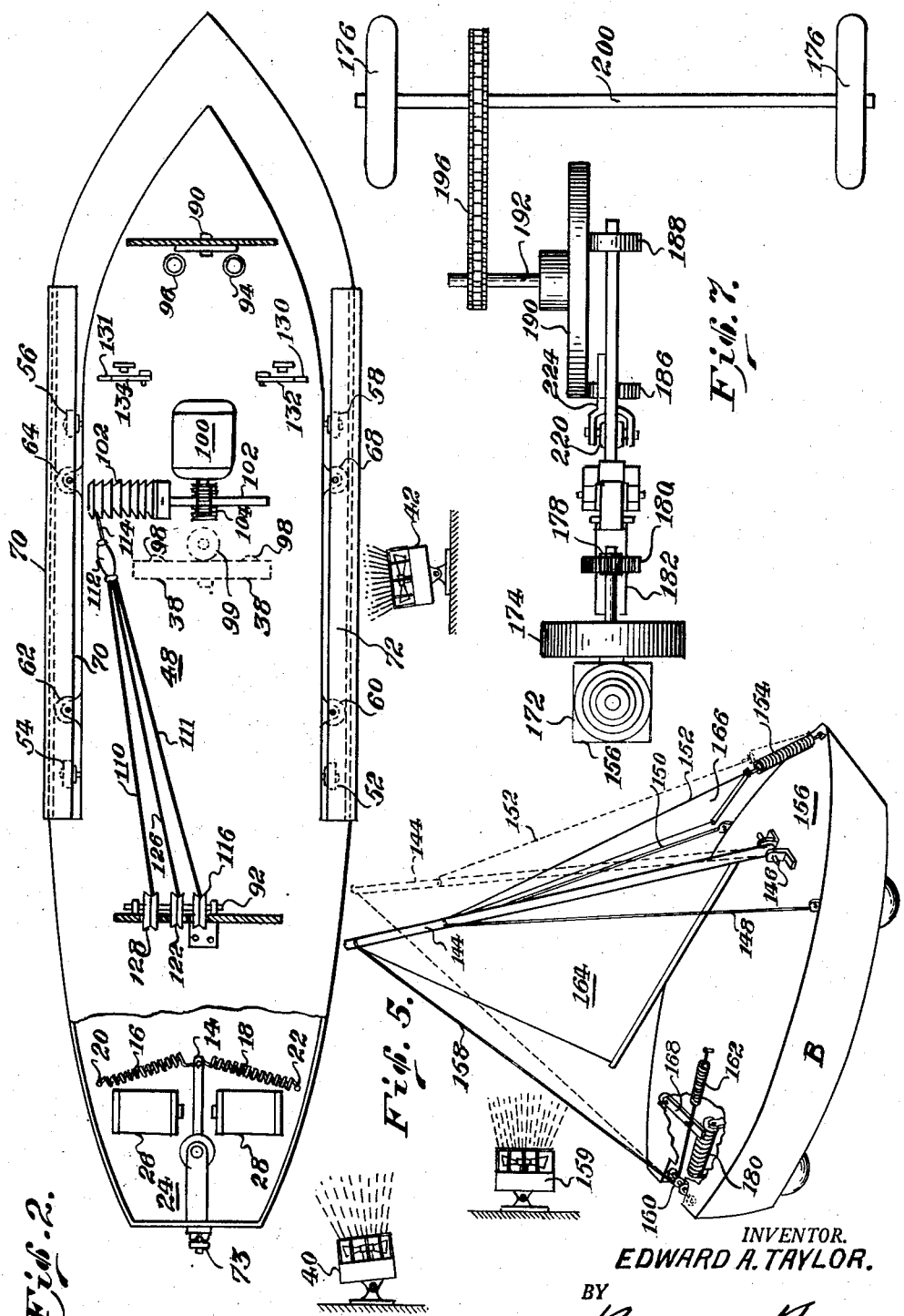

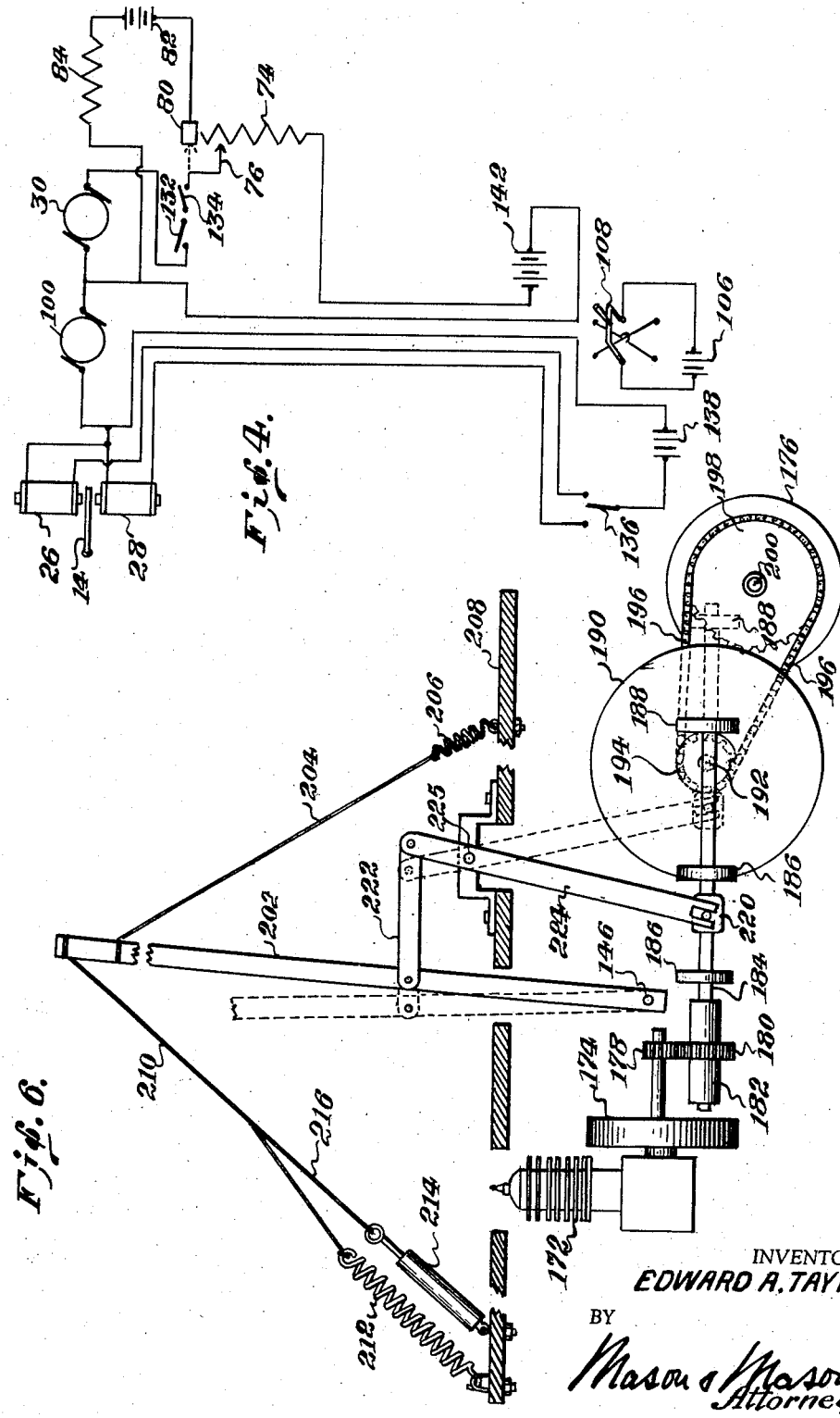

2,855,702

INSTRUCTION AND AMUSEMENT DEVICE FOR TEACHING THE ART OF SAILING A BOAT

Edward A. Taylor, New Castle, Del.

Application December 26, 1956, Serial No. 630,648

25 Claims. (Cl. 35—11)

This invention relates to the art of teaching the sailing of boats and further pertains to an amusement device.

An object of the invention is to provide a combined instructive and amusement device by providing a realistic means for teaching the sailing and racing of wind driven craft that are wheel supported for land use, whereby such combined instructive and amusement devices may be used without the dangers incident to the sailing of small boats in waters. Such sailings are subject to the vicissitudes of sudden weather changes and to other dangers.

A further object is to provide automatic means for varying the driving speed of such "sailing cars" in accordance with the velocity of the wind and the direction thereof to thereby more accurately simulate the sailing movements of a sailing vessel.

Heretofore, convention "sailing cars" have required a high wind to start them rolling due to comparatively high static friction, and when once started will rapidly increase their speed to speeds in excess of those permissible for practical remote control, whereas it is an additional object of this invention to provide a sailing car which is capable of starting its moverent on a light breeze and which is held to satisfactory speeds to thereby approximate accurately the operative characteristics of an actual sailboat as it sails the waters of a lake or other body of water.

Other objects will appear hereinafter throughout the specification and claims.

In the drawings:

Figure 1 is a longitudinal vertical section showing one form of the invention;

Figure 2 is a top plan view of the structure of Figure 1 with the sails removed, partly in section;

Figure 3 is a transverse vertical section taken on line 3—3 of Figure 1;

Figure 4 is a diagrammatic view of the electrical circuit;

Figure 5 is a perspective view of a modified form of the invention;

Figure 6 is an enlarged side elevational view of one form of driving mechanism, with parts in section;

Figure 7 is a top plan view of the structure of Figure 6;

Figure 8 is a perspective view, partly broken away, of still another form of the invention;

Figure 9 is an enlarged perspective view of a further modification.

Referring now to Figures 1 to 3 of the drawings which show the preferred form of the invention, A indicates a sailing car provided with a suitable number of supporting wheels. As indicated, 10 is a rear wheel pivotally mounted on shaft 12 having a bearing arm 13 provided with a tiller or arm 14 that is normally maintained in a position extending along the central longitudinal axis of the boat by a pair of springs 16 and 18, each of whose inner ends are connected to the tiller that forms an armature for the magnets, and whose outer ends are anchored at 20 and 22 to the main deck 24. A pair of magnets 26 and 28 for said armature are connected in the circuit shown in Figure 4 and may operate in the same manner as described in Patent No. 2,208,083, granted July 16, 1940, to Rousseau. This circuit is connected to the car by flexible wiring leading to the manually controlled switch and the source of current hereinafter described.

The sail car is propelled by an electric motor 30, which drives through gearing 32 the front wheels 34. This motor also drives through gearing 36, fly wheel 38 which is driven at high speed, thus storing energy whereby the vehicle is propelled after electricity to the reversible motor 30 has been turned off.

Numerals 40 and 42 indicate electric fans which may be positioned so as to fill the sails. Alternately when the sail car is used out of doors, the wind may be relied upon to fill the sails. The speed of the sail car is controlled by the resultant force of the sails 44 and 46, acting on deck car 48 through mast 50.

The deck car is supported on wheels 52, 54, 56 and 58, and is guided by wheels 60, 62, 64 and 68. All of these wheels travel in and are supported by the channel members 70 and 72 forming the sides of the main deck 24, as shown in Figures 2 and 3. The deck car is restrained against forward movement by spring 71 that is attached to main deck 24, see Figure 1.

Attached as shown in Figure 1 to the main deck, is resistance unit 74. Movable along the resistance unit is a sliding contact 76 which latter is attached to and insulated from the bottom 78 of the deck car 48.

When the deck car is in its extreme aft position sliding contact 76 contacts ring 80. When this occurs motor 30 is energized to reverse its rotation and reverse the movement of the sail car A.

Referring now to Figure 4, the numeral 82 is an electromotive source of power, such as a battery. This battery supplies current through resistance 84 proportional to give a minimum reverse speed of the boat car. In the circuit also are single pole single throw switches 132 and 134 which are manually operated to closed position for normal operation.

The control box of Fig. 1 may be in the car or attached to a fixture outside the car. This applies in all figures using electric motor drive means.

The deck car has a pivoted top portion 88, pivoted fore and aft to the deck car at 90 and 92 respectively. Mast 50 is mounted on the pivoted top portion 88. Any movement of the top deck portion 88 about pivots 90 and 92 in either direction about these pivots due to the sails filling with wind is resisted by either of the springs 94 and 96 which extend on either side of these pivots and are attached to deck car 48 as shown in Figure 3. As seen in Figure 1, movements of the deck car 48 are cushioned or snubbed by the dash pot 49 mounted on main deck 24, the piston 51 of which is connected to the deck car.

Small protuberances or cams 98 are placed in spaced positions on fly wheel 38 which run against cam follower wheel 99 located on the center line of the deck car for the purpose of maintaining the deck car in a "live" state.

Mechanism for controlling the positioning of the sails, is attached by means of a motor 100, see particularly Figures 1, 2 and 4. This motor drives the drum 102 through worm gearing 104. Referring to Figure 4, it will be noted that battery 106 is connected to and furnishes current for this motor through the reversing DPDT switch 108. The main sheet 111, jib sheet 126, and the rubber tensioning cord 110 are attached to one end of the swivel 112. A single cord 114 is attached to the other end of swivel 112, and the end thereof is fastened at the inboard end of the drum 102.

The main sheet 111 runs around the sheave 113 and this is attached to the main boom 118. The jib sheet 46 runs around sheave 120 through block 122, as shown in Figure 1, and is attached to the jip boom 124. A rubber tension cord 110 runs around sheave 128 and is attached forwardly on the top deck 88. The length of the sheets is proportioned to haul both sails in tight, with the cord 114 completely wound on the drum 102. When the motor is operated to direct the cord onto the drum, any excess of the winding cord drops off the drum end. The size of the drum is so proportioned whereby to allow slack in the sheets after the sails are let out, and this permits an over-run during unwinding.

As heretofore described the top deck 88 is pivoted at 90 and 92, and is ordinarily restrained by the spring 94 and 96. This spring support of the top deck permits the mast and the top deck to heel down under the pressure of the wind on the sails, thus simulating the action of sail boats which are healed over by the action of the wind on the sails. As shown in Figure 3, the top deck 88 strikes either of the levers 130 or 131 of the switches 132 and 134 respectively if the heel over movement is excessive transversely of the vessel in either direction.

Should the top deck heel over to the extent shown for instance in Figures 3, it will strike the lever 130 and open switch 132, stopping motor 30 and, conversely, if the heeling over movement is in the opposite direction, lever 131 will be struck, opening switch 134 and stopping motor 30. It will be seen therefore that if the deck pivots to an excessive amount in either direction, the movement of the boat car is stopped, thereby simulating turning over. This construction is particularly of use when two or more cars are racing. The switches are restored to their upper position by hand.

The remote control box containing the steering switch 136, the sail control switch 108, and the batteries 106, 138 and 142 is shown in Figure 4. These are connected to the sail car by a flexible five-wire cable 140.

Referring now to Figure 5, wherein a second form of the invention is disclosed, B is the sail car. This car is provided with no movable deck corresponding to that shown in Figures 1 and 2, the mast 144 being supported on a pivot 146 at its base, by two stays 148 and 150, and jib stay 152, the latter being tensioned by a spring 154 attached to the deck 156. This spring is tensioned by the back stay 158 which runs over the sheave 160 and tensioned by spring 162. The spring 162 is so proportioned as to have a greater pull than the spring 154, thus restraining the mast 144 slightly aft of the vertical when no wind is blowing but permitting the mast to lean from the vertical under the force of wind on the sails 164 and 166.

Control of the propulsion motor corresponding to motor 30 (Figure 4) is obtained from the above displacement through slide member 168 which is fastened to the back stay 158, traveling over the resistance unit 180. This controls the front drive wheels by a motor drive corresponding to motor 30 and gearing 32, as shown in the Figure 1 construction.

There has been shown a further modified form of the invention in Figures 6 and 7. The form shown in Figures 6 and 7 is preferably used for a man-carrying boat car but it could be used when the boat car is of toy size. A motor, here shown as a gasoline motor 172, furnishes a nearly constant speed to the fly wheel 174. This motor drives the front drive wheels 176 through a friction drive, spur gears 178 and 180, through spline 182 on spline shaft 184, friction wheels 186 and 188, friction drive plate 190, drive shaft 192, which has a wheel sprocket 194, chain 196, and sprocket wheel 198 and drive shaft 200, on which wheels 176 are mounted.

The control of the transmission is obtained from a pivoted mast 202 of the type generally shown in Figure 5. The mast is provided with a front stay 204 connected by a spring 206 to the deck 208. A back stay 210 is connected by a spring 212 to the deck. A dash pot 214 also connected to the deck is further connected by flexible member 216 to the back stay 210, as shown in Figure 6. The mast is linked to the thrust collar 220 through arm 222 and lever 224, the latter being pivoted to the deck at 225. A typical means of propulsion for the sails is the fan 159, such as is shown in Figure 5.

In the construction shown in Figures 6 and 7, with the boat car headed into the wind, the mast is restrained in its aft position by the spring 212 and thrust collar 220 connecting through arms 222 and 224. With the mast in its extreme aft position as shown in dotted line, friction wheel 186 is in contact with the friction plate 190 and the car is driven backward slowly. As the sails are filled with wind in the method conventional to sailing, the mast 202 pivots in a forward direction causing the thrust collar 220 to move aft along shaft 184. Friction drive wheel 186 becomes disengaged with friction plate 190, and friction wheel 188 engages the said friction plate 190. The car now starts to move forward, gaining in speed as the mast moves further forward. The dash pot 214 serves to delay the reversing of the sail car when the wind is spilled from the sails and causes a continuation of the forward motion for a short period of time. This simulates the coasting of a sail boat and moreover, it makes possible the "going about" and the rounding of buoys.

Yet another additional form of the invention is illustrated in Figure 8 wherein C is the hull of the boat, and this may be provided with a pair of forward wheels 226, only one of which is shown, and a rear wheel 228.

In this form of the invention the mast is provided adjacent the upper end thereof, i. e. adjacent the connection of the same with the jib stay, back stay and shroud. Preferably the type of sailing car shown and described in this form is propelled by winds as distinguished from the air from an electric fan. As shown in the drawings, 230 is a mast and 232 (only one of which is shown) are the shrouds while 236 is the jib stay and 238 is the back stay. Extending through the mast adjacent the lower end thereof is a shaft 234 on which are mounted flange rollers 240 and 242. These rollers permit the mast to have limited movement similar to that of a pendulum. Rollers 240 and 242 roll on tracks 244 and 246, each having a forward and a rearward stop 248 and 250 respectively.

The lowermost portion of the mast is provided with a bracket 252 having a forwardly extending arm 254 connected to a piston 256 of the dash pot 258. The arm 254 corresponds to the arm 222 of Figure 6.

Now referring to Figure 9, it will be noted that instead of using the electrical control means shown in Figure 8, a mechanical control means is shown similar to that shown in Figure 6, however utilizing the individual movement of the lower end of the mast. In this construction, arm 254 is pivoted at 260 to a lever 262. This latter lever is provided with an arm 263 which may be connected to any fixed portion (not shown) of the hull and the arm 262 operates in the same manner as the arm 224 of Figure 6 and controls the parts indicated below deck in that figure. In view of the full showing of Figure 6, no repetition of these parts has been made in Figure 9.

Also connected adjacent the lowermost portion of mast 230 is a flexible connecting member 264 whose flexible connecting member is connected to spring 266, the free end of which is connected as at 268 to the hull C.

As shown in Figure 8, 270 is a rheostat having a sliding contact 272 connected to flexible member 264.

The structure shown in Figures 8 and 9 is an advantageous one in that in this form less displacement of the sails is required in which to cause a given displacement of the control linkage or rheostat sliding contact 272.

The broadest concept of the invention as shown in all of the forms described above is the provision of means which utilizes the forward force from the sails to control the propulsion of the car, i. e., the forward movement of the sails controls the amount of energy furnished by the prime mover such as the internal combustion and electric motors shown in the several figures.

A subsidiary but nevertheless important feature of the invention is the use of a traveling member, such as the traveling deck car shown, to control the output of a prime mover such as any one of the motors shown. As a corollary to the foregoing, the device of the present invention is provided with means for controlling the speed of the ground or floor engaging wheels in accordance with the position of an oscillating mast, the position of said mast being controlled in accordance with wind velocity.

The device of the present invention may be used either as an instructive toy or as a vehicle to be used for instruction or amusement purposes, or both.

It will be further understood that although the first form of the invention discloses a mast support which may move forward and backward on wheels or rollers, this type of support for the mast may also be used in the construction shown in the forms of the invention shown in Figures 5, 6 or 8.

The word "vehicle" or "boat hull" in the claims includes a toy vehicle or boat hull, or a person supporting vehicle or boat hull.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An instruction and amusement device for teaching the art of sailing a boat comprising a vehicle having at least one ground engaging drive wheel, said vehicle having at least one sail, a mast for supporting said sail, means mounting said mast for oscillatory movement on said vehicle, motor means for driving said ground engaging drive wheel, means for controlling the speed of said motor means, and means connecting said last named means to said mast whereby to control the speed of said motor means and the ground engaging drive wheel driven thereby in accordance with the oscillatory movements of said mast.

2. The constructure of claim 1 wherein said vehicle includes a simulated boat hull, and a jib stay, a back stay and shrouds connected to said hull and to said oscillatory mast.

3. An apparatus as specified in claim 1, in which said means for mounting said mast comprises a deck car having mobile supporting rolling means whereby said mast may roll on said vehicle in addition to the oscillatory movements thereof.

4. An instruction and amusement device for teaching the art of sailing a boat comprising a boat hull having ground supporting wheels, motor means, means for controlling the speed of said motor means, means for driving at least on of said wheels by said motor means, a mast having an upper and a lower end, means pivotally supporting one of said ends of said mast on said boat hull, wind driven sail means supported by said mast, standing rigging connecting the upper end of said mast to said hull, and means operatively connected to said motor controlling means and to said mast whereby to control the speed of said motor means and said ground supporting wheels, in accordance with the position of said mast as governed by said wind driven sail means.

5. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails.

6. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull comprising at least one roller on said mast lower end and a track supported on said boat hull and adapted to be rollingly engaged by said roller, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails.

7. An instruction and amusement device for teaching the art of sailing a boat comprising a boat hull having ground supporting wheels, motor means, means for controlling the speed of said motor means, means for driving at least one of said wheels by said motor means, a mast having an upper and a lower end, means pivotally supporting one of said ends of said mast on said boat hull, wind driven sail means supported by said mast, standing rigging connecting the upper end of said mast to said hull, and means operatively connected to said motor controlling means and to said mast whereby to control the speed of said motor means and said ground supporting wheels, in accordance with the position of said mast as governed by said wind driven sail means, said motor controlling means including an electric circuit and a rheostat.

8. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said motor controlling means including an electric circuit and a rheostat.

9. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull comprising at least one roller on said mast lower end and a track supported on said boat hull and adapted to be rollingly engaged by said roller, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said motor controlling means including an electric circuit and a rheostat.

10. An instruction and amusement device for teaching the art of sailing a boat comprising a boat hull having ground supporting wheels, motor means, means for controlling the speed of said motor means, means for driving at least one of said wheels by said motor means, a mast having an upper and a lower end, means pivotally supporting one of said ends of said mast on said boat hull, wind driven sail means supported by said mast, standing rigging connecting the upper end of said mast to said hull, and means operatively connected to said motor controlling means and to said mast whereby to control the speed of said motor means and said ground supporting wheels, in accordance with the position of said mast as governed by said wind driven sail means, said means operatively connected to said motor controlling means and to said mast including a lever system.

11. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said means operatively connected to said motor controlling means and to said mast including a lever system.

12. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull comprising at least one roller on said mast lower end and a track supported on said boat hull and adapted to be rollingly engaged by said roller, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said means operatively connected to said motor controlling means and to said mast including a lever system.

13. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means pivotally supporting one of said ends of said mast on said boat hull, wind driven sail means supported on said mast, standing rigging connecting the upper end of said mast to said hull, and means operatively connected to said motor controlling means and to said mast whereby to control the speed of said motor means and said ground supporting wheels, in accordance with the position of said mast as governed by said wind driven sail means, said means operatively connected to said motor controlling means and to said mast including a lever system, and a flywheel connected to said motor means.

14. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said means operatively connected to said motor controlling means and to said mast including a lever system, and a flywheel connected to said motor means.

15. An instruction and amusement device for teaching the art of sailing a boat comprising a boat hull having ground supporting wheels, motor means, means for controlling the speed of said motor means, means for driving at least one of said wheels by said motor means, a mast having an upper end and a lower end, means for supporting said lower end of said mast for longitudinal rolling movements on said boat hull comprising at least one roller on said mast lower end and a track supported on said boat hull and adapted to be rollingly engaged by said roller, wind driven sail means supported by said mast, standing rigging connecting the upper end of said mast to said boat hull, and means operatively connected to said motor controlling means and to said mast, whereby to control the speed of said motor means and said ground supporting wheels in accordance with the position of said mast as governed by said wind driven sails, said means operatively connected to said motor controlling means and to said mast including a lever system, and a flywheel connected to said motor means.

16. An instruction and amusement device for teaching the art of sailing a boat comprising a vehicle having ground supporting wheels, motor means for driving at least one of said ground supporting wheels, a mast, means for oscillatingly supporting said mast on said vehicle, standing rigging connected to said mast and to said vehicle, wind driven sail means supported on said mast, and means operatively connected to said mast for automatically controlling the speed of said wheels and the vehicle supported thereby in accordance with the position of oscillation of said mast as governed by said wind driven sail means.

17. The device of claim 16 in which said mast supporting means comprises a deck car having wheels and track means on said vehicle rollingly engaged by said wheels.

18. The device of claim 16 in which said mast supporting means comprises pivotal supporting means whereby to permit transverse pivotal movements of said mast.

19. The device of claim 16 in which said mast supporting means comprises a deck car, pivot means on said deck car for permitting pivotal movements of said mast and sail means in a direction transverse to the longitudinal axis of said vehicle.

20. The device of claim 16 in which said mast supporting means comprises a deck car having means for permitting fore and aft movements and transverse movements of said mast and sails relative to said vehicle, as governed by said wind driven sails.

21. The apparatus as specified in claim 1 wherein said mast is provided with resilient restraining means whereby to restrain forward oscillatory movements thereof.

22. The apparatus as specified in claim 21 wherein said mast resilient restraining means comprises a spring provided with means connecting one of its ends to said vehicle and its other end connected to said mast.

23. The apparatus of claim 5 wherein said means for supporting said mast for longitudinal movement permits said mast to move forwardly on said boat hull, spring means for returning said mast to its original position, and retarding means for delaying the return movements of said mast by said spring means.

24. The apparatus of claim 23 wherein said retarding means includes a flywheel connected to said motor means.

25. The apparatus of claim 23 wherein said retarding means includes a dashpot connected to said mast.

References Cited in the file of this patent

UNITED STATES PATENTS

| | | |
|---|---|---|
| 1,895,737 | Shaw | Jan. 31, 1933 |
| 2,208,083 | Rousseau | July 16, 1940 |
| 2,316,181 | Ocker et al. | Apr. 13, 1943 |

OTHER REFERENCES

Sidewalk Sailboat—Popular Mechanics, June 1946, page 181.